United States Patent [19]

Greenwood

[11] 4,069,137
[45] Jan. 17, 1978

[54] HYDROGEN-PRODUCING HYDROCARBON CONVERSION WITH GRAVITY-FLOWING CATALYST PARTICLES

[76] Inventor: Arthur R. Greenwood, Niles, Ill.

[21] Appl. No.: 735,708

[22] Filed: Oct. 26, 1976

[51] Int. Cl.$^2$ .................. C10G 35/12; C10G 39/00
[52] U.S. Cl. .................................. 208/65; 208/165; 208/169
[58] Field of Search .................. 208/64, 65, 165, 169

[56] References Cited

U.S. PATENT DOCUMENTS

| 2,285,727 | 6/1942 | Komarewsky | 208/64 |
|---|---|---|---|
| 2,335,610 | 11/1943 | Plummer | 208/64 |
| 2,689,821 | 9/1954 | Imhoff et al. | 208/64 |
| 3,516,924 | 6/1970 | Forbes | 208/65 |
| 3,706,536 | 12/1972 | Greenwood et al. | 208/175 |
| 3,843,740 | 10/1974 | Mitchell et al. | 208/64 |

Primary Examiner—Herbert Levine
Attorney, Agent, or Firm—James R. Hoatson, Jr.; Robert W. Erickson; William H. Page, II

[57] ABSTRACT

A multiple-stage catalytic conversion system in which a hydrocarbonaceous charge stock is reacted in a plurality of stacked catalytic reaction zones through which catalyst particles flow downwardly via gravity-flow. The charge stock, in the absence of added, or recycle hydrogen, is reacted first in the lowermost reaction zone, from which deactivated catalyst particles are withdrawn from the system. Resulting reaction zone effluent is further reacted in the uppermost reaction zone, through which fresh, or regenerated catalyst particles are introduced into the system, and serially in one or more subsequent, lower reaction zones. Product effluent from the reaction zone immediately above the lowermost zone is separated to recover the desired normally liquid product.

10 Claims, 1 Drawing Figure

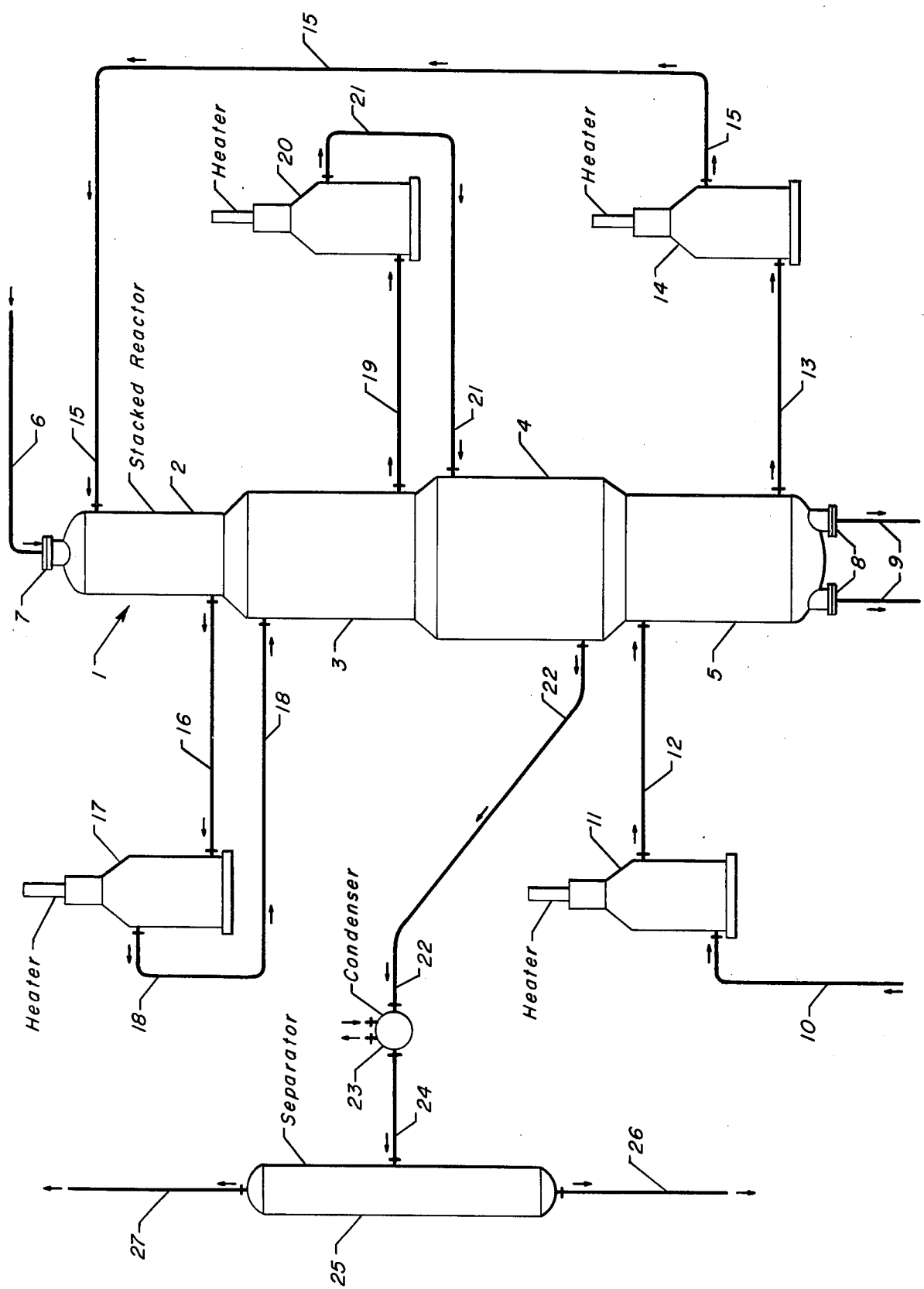

HYDROGEN-PRODUCING HYDROCARBON CONVERSION WITH GRAVITY-FLOWING CATALYST PARTICLES

APPLICABILITY OF INVENTION

The present invention is directed toward an improved technique for effecting the catalytic conversion of a hydrocarbonaceous reactant stream in a multiple-stage reaction system wherein (1) the reactant stream flows serially through the plurality of reaction zones and, (2) the catalyst particles are movable through each reaction zone via gravity-flow. More particularly, the described process technique is adaptable for utilization in vapor-phase systems where the conversion reactions are principally hydrogen-producing, or endothermic, where the multiple reaction zones are vertically stacked, sharing a common vertical axis, and where the catalyst particles flow downwardly through and from one zone to the next lower zone via gravity-flow.

Various types of multiple-stage reaction systems have found widespread utilization throughout the petroleum and petrochemical industries for effecting multitudinous reactions, especially hydrocarbon conversion reactions. Such reactions are either exothermic, or endothermic, and both hydrogen-producing and hydrogen-comsuming. Multiple-stage reaction systems are generally of two types: (1) side-by-side configuration with intermediate heating between the reaction zones, wherein the reactant stream or mixture flows serially from one zone to another zone; and, (2) a stacked design wherein a single reaction chamber, or more, contains the multiple catalytic contact stages. Such systems, as applied to petroleum refining, have been employed to effect numerous hydrocarbon conversion reactions including those which are prevalent in catalytic reforming, alkylation, ethylbenzene dehydrogenation to produce styrene, other dehydrogenation processes, etc. My invention is specifically intended for utilization in endothermic, or hydrogen-producing, hydrocarbon conversion processes, in the reaction zones of which the catalyst particles are movable via gravity-flow. Thus, it is contemplated that the technique encompassed by the present invention can be employed where the reaction zones (1) exist in side-by-side relationship, and catalyst particles are transported from the bottom of one zone to the top of the next succeeding zone, (2) where the reaction zones are stacked, sharing a common vertical axis, and the catalyst particles also flow from one zone to another via gravity and, (3) a combination thereof wherein one or more zones are disposed in side-by-side relationship with the stacked reaction zones. Therefore, since catalyst particles which are movable through a system by way of gravity-flow are necessarily moving in a downwardly direction, the present process contemplates the withdrawal of catalyst particles from a bottom portion of one reaction zone and the introduction of fresh, or regenerated catalyst particles into the top portion of a second reaction zone. My invention is also intended to be applied to those reaction systems wherein the catalyst is disposed as an annular bed and the flow of the reactant stream, serially from one zone to another reaction zone, is perpendicular, or radial to the movement of catalyst particles. In the interest of brevity, the following discussion will be directed toward those systems wherein a downwardly moving bed of catalyst particles is employed in the conversion of a hydrocarbonaceous reactant stream, with the catalyst particles being disposed in the form of an annular bed, through which the reactant stream flows laterally and radially.

A radial-flow reaction system generally consists of tubular-form sections, of varying nominal cross-sectional areas, vertically and coaxially disposed to form the reaction vessel. Briefly, the system comprises a reaction chamber containing a coaxially disposed catalyst-retaining screen, having a nominal, internal cross-sectional area less than said chamber, and a perforated centerpipe having a nominal, internal cross-sectional area less than the catalyst-retaining screen. The reactant stream is introduced in vapor-phase, into the annular-form space created between the inside wall of the chamber and the outside surface of the catalyst-retaining screen. The latter forms an annular-form, catalyst-holding zone with the outside surface of the perforated centerpipe; vaporous reactant flows laterally and radially through the screen and catalyst zone into the centerpipe and out of the reaction chamber. Although the tubular-form configuration of the various reactor components may take any suitable shape — i.e., triangular, square, oblong, diamond, etc. — many design, fabrication, and technical considerations indicate the advantages of using components which are substantially circular in cross-section.

Illustrative of a multiple-stage stacked reactor system, to which the present invention is particularly adaptable, is that shown in U.S. Pat. No. 3,706,536 (Cl. 23-288 G), issued Dec. 19, 1972. As indicated, the transfer of the gravity-flowing catalyst particles from one reaction zone to another, as well as introduction of fresh catalyst particles and withdrawal of "spent" catalyst particles, is effected through the utilization of a plurality of catalyst-transfer conduits. Briefly, my inventive concept encompasses a process wherein the fresh feed charge stock, in the absence of added, or recycled hydrogen, first contacts those catalyst particles which have advanced to the highest degree of deactivation, with respect to all the catalyst within the multiple-stage system. A primary beneficial advantage stems from the accompanying elimination of the compressor otherwise required to recycle the hydrogen-rich vaporous phase separated from the desired normally liquid product.

OBJECTS AND EMBODIMENTS

A principal object of my invention is to eliminate compressive recycle of hydrogen in a multiple-stage, hydrogen-producing hydrocarbon conversion process without requiring an excessively large catalyst regeneration system. A corollary objective is to afford significant utilities savings, energy, in hydrocarbon conversion processes wherein large quantities of hydrogen are normally circulated.

A specific object of the present invention is directed toward an improvement in the catalytic reforming of hydrocarbons in a multiple-stage reaction zone system through which catalyst particles are movable via gravity-flow.

Therefore, in one embodiment, my invention is directed toward a process for the catalytic reforming of a hydrocarbon charge stock in a multiple-stage system in which (1) catalyst particles flow downwardly, via gravity, through each reaction zone in said system, (2) catalyst particles are transferred in series from reaction zone to reaction zone in said system, (3) deactivated catalyst particles are withdrawn from said system through the lower end of the last reaction zone and, (4) fresh, or regenerated catalyst particles are introduced into the upper end of the first reaction zone, which process comprises the sequential steps of: (a) reacting said charge stock, in the absence of added hydrogen, in said last reaction zone, from which deactivated catalyst particles are withdrawn from said system, at catalytic reforming conditions; (b) further reacting the effluent from said last reaction zone in said first reaction zone, through which fresh or regenerated catalyst particles are introduced into said system, at catalytic reforming conditions; (c) further reacting the effluent from said first reaction zone in at least one intermediate reaction zone, at catalytic reforming conditions; and, (d) recovering a normally liquid, catalytically-reformed product from the effluent withdrawn from said intermediate reaction zone.

In a more specific embodiment, the present technique involves a multiple-stage hydrocarbon catalytic reforming process which comprises the steps of: (a) introducing fresh, or regenerated catalyst particles into the upper end of a first reaction zone, through which said particles are movable via gravity-flow, and transferring catalyst particles from the lower end of said first zone into the upper end of a second reaction zone, through which said catalyst particles are movable via gravity-flow; (b) transferring catalyst particles from the lower end of said second zone and introducing them into the upper end of a third reaction zone, through which catalyst particles are movable via gravity-flow; (c) transferring catalyst particles from the lower end of said third zone and introducing them into the upper end of a fourth reaction zone, through which catalyst particles are movable via gravity-flow, and withdrawing deactivated catalyst particles from the lower end of said fourth zone; (d) reacting a hydrocarbon charge stock, in the absence of added hydrogen, in said fourth reaction zone at catalytic reforming conditions; (e) further reacting the resulting fourth zone effluent in said first reaction zone at catalytic reforming conditions; (f) further reacting the resulting first zone effluent in said second reaction zone at catalytic reforming conditions; (g) further reacting the resulting second zone effluent in said third reaction zone at catalytic reforming conditions; and, (h) recovering a normally liquid, catalytically-reformed product from the resulting third reaction zone effluent.

These, as well as other objects and embodiments will become evident from the following, more detailed description of the present hydrocarbon conversion process. In one such other embodiment, the four catalytic reforming reaction zones are disposed as a vertical stack having a common vertical axis, and catalyst particles are movable from one reaction zone to the next succeeding reaction zone via gravity-flow. In another embodiment, the last reaction zone, into which the fresh feed charge stock is introduced and from which the deactivated catalyst particles are withdrawn from the system, contains the least amount of catalyst particles. Thus, for example, where the system comprises four reaction zones, the first zone contains about 10.0 to about 20.0% by volume of the total catalyst, the second zone about 20.0 to about 30.0%, the third zone about 40.0 to about 60.0% and the last reaction zone, into which the charge stock is first introduced, about 5.0 to about 15.0%.

PRIOR ART

Candor compels recognition of the fact that various types of hydrocarbon conversion processes utilize multiple-stage reaction systems, either in side-by-side configuration, as a vertically-disposed stack, or a combination of a stacked system in side-by-side relation with one or more separate reaction zones. As applied to petroleum refining, such systems may be employed in a wide variety of hydrocarbon conversion reactions. While my inventive concept is adaptable to many conversion reactions and processes, through the reaction system of which the catalyst particles are movable via gravity-flow, the same will be additionally described in conjunction with the well-known endothermic, or hydrogen-producing catalytic reforming process. Historically, the catalytic reforming process has been effected in a non-regenerative, fixed-bed system comprising a plurality of reaction zones in side-by-side relation. When the catalytic composite has become deactivated to the extent that continuous operation was no longer economically feasible, the entire unit was shut-down and the catalyst regenerated in situ. Of more recent vintage is the so-called "swing bed" system in which an extra reactor is substituted for one which is due to be placed off-stream for regeneration purposes. Still more recently, multiple-stage reactor systems have been provided in which the catalyst particles flow, via gravity, through each reaction zone. In a "stacked" system, the catalyst particles also flow downwardly from one catalyst-containing zone to another and ultimately transfer to a suitable regeneration system also preferably functioning with a downwardly moving bed of catalyst particles. In effect, the catalyst particles are maintained from one section to another in a manner such that the flow of catalyst is continuous, at frequent intervals, or at extended intervals, with the movement being controlled by the quantity of catalyst withdrawn from the last of the series of individual reaction zones.

U.S. Pat. No. 3,470,090 (Cl. 208-138) issued Sept. 30, 1969 illustrates a multiple-stage, side-by-side reaction system with intermediate heating of the reactant stream which flows serially through the individual reaction zones. Catalyst withdrawn from any one of the reaction zones is transported to suitable regeneration facilities. A system of this type can be modified to the extent that the catalyst particles withdrawn from a given reaction zone are transported to the next succeeding reaction zone, while the catalyst withdrawn from the last reaction zone may be transported to a suitable regeneration facility. The necessary modifications can be made in the manner disclosed in U.S. Pat. No. 3,839,197 (Cl. 208-174), issued Oct. 1, 1974, involving an inter-reactor catalyst transport method. Catalyst transfer from the last reaction zone to the top of the catalyst regeneration zone is possible through the technique illustrated in U.S. Pat. No. 3,839,196 (Cl. 208-174), issued Oct. 1, 1974.

A stacked reaction configuration is shown in U.S. Pat. No. 3,647,680 (Cl. 308-65), issued Mar. 7, 1972, as a two-stage system having an integrated regeneration facility which receives that catalyst withdrawn from the bottom reaction zone. Similar stacked configurations are illustrated in U.S. Pat. No. 3,692,496 (Cl. 23-288G), issued Sept. 19, 1972 and U.S. Pat. No. 3,725,249 (Cl. 208-139), issued Apr. 3, 1973.

As hereinbefore stated, general details of a three reaction zone, stacked system are present in U.S. Pat. No. 3,706,536 (Cl. 23-288G), issued Dec. 19, 1972, and illustrates one type of multiple-stage system to which the present inventive concept is applicable. It should be noted, as generally practiced in a catalytic reforming unit, that each succeeding reaction zone contains a greater volume of catalyst. U.S. Pat. No. 3,864,240 (Cl. 208-64), issued Feb. 4, 1975, is illustrative of the integration of a reaction system having gravity-flowing catalyst particles with a fixed-bed system. As stated in this reference, one of the advantages resides in revamping an existing three reaction zone, fixed-bed system to conform to the integrated system. In such a modification, it is suggested that a second compressor be added to permit the split-flow of hydrogen-rich recycle gas as also described in U.S. Pat. No. 3,516,924 (Cl. 208-75), issued June 23, 1970.

U.S. Pat. No. 3,725,248 (Cl. 208-138), issued Apr. 3, 1973 illustrates a multiple-stage system in side-by-side configuration with gravity-flowing catalyst particles being transported from the bottom of one reaction zone to the top of the next succeeding reaction zone, those catalyst particles being removed from the last reaction zone being transferred to suitable regeneration facilities. As illustrated, the flow of the fresh feed charge stock is countercurrent to the flow of catalyst particles from one zone to the top of the next succeeding reaction zone. Thus, the fresh feed initially contacts those catalyst particles which have experienced the greatest degree of deactivation. However, there is no recognition of the "no recycle hydrogen" concept forming the foundation of the present invention. As stated, conventional reforming entails admixing a considerable excess of hydrogen with the hydrocarbon charge stock — e.g. up to about a mole ratio of hydrogen/hydrocarbon of 10.0:1.0.

These illustrations are believed to be fairly representative of the art which has developed in the multiple-stage conversion systems wherein catalyst particles are movable through each reaction zone via gravity-flow. Noteworthy is the fact that none recognize the inventive concept of not recycling the hydrogen-rich vapors separated from the desired normally liquid products.

SUMMARY OF INVENTION

As hereinbefore set forth, the process encompassed by my inventive concept is suitable for use in hydrocarbon conversion systems characterized as multiple-stage and in which catalytic particles are movable, via gravity-flow, in each reaction zone. Furthermore, the present invention is principally intended for utilization in systems where the principal reactions are endothermic, or hydrogen-producing, and are effected in vapor-phase operation. Although the following discussion is specifically directed toward catalytic reforming of naphtha boiling range fractions, there is no intent to so limit the present invention. Catalytic reforming, as well as many other processes, has experienced several phases of development currently terminating in a system in which the catalyst beds assume the form of a descending column in one or more reaction vessels. Typically, the catalysts are utilized in spherical form having a nominal diameter ranging from about 1/32-inch to about 5/32-inch in order to offer free-flow characteristics which will neither bridge, nor block the descending column, or columns of catalyst within the overall system. In one such multiplestage system, the reaction chambers are vertically stacked, and a plurality (generally from 6 to 16) of relatively small diameter conduits are employed to transfer catalyst particles from one reaction zone to the next lower reaction zone (via gravity-flow) and ultimately as withdrawn catalyst from the last reaction zone. The latter are usually transported to the top of a catalyst regeneration facility, also functioning with a descending column of catalyst particles; regenerated catalyst particles are transported to the top of the upper reaction zone of the stack. In order to facilitate and enhance gravity-flow within each reaction vessel, as well as from one to another, it is particularly important that the catalyst particles have a relatively small nominal diameter, and one which is preferably less than about 5/32-inch. In a conversion system having the individual reaction zones in side-by-side relationship, catalyst transport vessels (of the type shown in U.S. Pat. No. 3,839,197) are employed in transferring the catalyst particles from the bottom of one zone to the top of the succeeding zone, and from the last reaction zone to the top of the regeneration facility.

Catalytic reforming of naphtha boiling range hydrocarbons, a vapor-phase operation, is effected at conversion conditions which include catalyst bed temperatures in the range of about 700° to about 1020° F.; judicious and cautious techniques generally dictate that catalyst temperatures not substantially exceed a level of about 1020° F. Other conditions include a pressure from about 50 psig. to about 1000 psig., a liquid hourly space velocity (defined as volumes of fresh charge stock per hour, per volume of total catalyst particles) of from 0.2 to about 10.0 and, prior to the present invention, a hydrogen to hydrocarbon mole ratio from about 1.0:1.0 to about 10.0:1.0, with respect to the initial reaction zone. As those possessing the requisite skill in the refining art are aware, the described continuous regenerative reforming system offers numerous advantages when compared to the prior fixed-bed systems. Among these is the capability of efficient operation at lower pressures — e.g. 50 psig. to about 150 psig. — and higher liquid hourly space velocities — e.g. 3.0:1.0 to about 8.0:1.0. Further, as a result of continuous catalyst regeneration, higher consistent inlet catalyst bed temperatures can be maintained — e.g. 950° to about 1010° F. There can also exist a corresponding increase in both hydrogen production and hydrogen purity in the vaporous phase recovered from the product separator.

Catalytic reforming reactions are multifarious, and include the dehydrogenation of naphthenes to aromatics, the dehydrocyclization of paraffins to aromatics, the hydrocracking of long-chain paraffins into lower-boiling normally-liquid material and, to a certain extent, the isomerization of paraffins. These reactions are effected through the use of one or more Group VIII noble metals (e.g. platinum, iridium, rhodium) combined with a halogen (e.g. chlorine and/or fluorine) and a porous carrier material such as alumina. Recent investigations have indicated that more advantageous results are attainable and enjoyed through the cojoint use of a catalytic modifier; these are generally selected from the group of cobalt, nickel, gallium, germanium, tin, rhenium, vanadium and mixtures thereof. Regardless of the particular selected catalytic composite, the ability to attain the advantages over the common fixed-bed systems is greatly dependent upon achieving substantially uniform catalyst flow downwardly through the system.

Catalytic reforming, as currently conventionally practiced, is a well known process which has been thoroughly described in the literature, having been a commercially important tool of the petroleum refining industry for more than a quarter of a century. One of the many things gleaned from the vast amount of reforming experience and resulting knowledge is the soundness of utilizing multiple stages, each of which contains a different quantity of catalyst, expressed generally as volume percent. The reactant stream, hydrogen and the hydrocarbon feed, flows serially through the reaction zones in order of increasing catalyst volume with, of course, interstage heating. In a three reaction zone system, typical catalyst loadings are: first, 10.0% to about 30.0% second, from 20.0% to about 40.0%; and, third, from about 40.0% to about 60.0%. With respect to a four reaction zone system, suitable catalyst loading would be: first, 5.0 to about 15.0%; second, 10.0 to about 20.0%; third, 20.0 to about 30.0%; and, fourth, 40.0 L to about 60.0%. Unequal catalyst distribution, increasing in the serial direction of reactant stream flow, facilitates and enhances the distribution of the reactions and the overall heat of reaction.

Current operating techniques involve separating the total effluent from the last reaction zone, in a so-called high-pressure separator, at a temperature of about 60° to about 140° F., to provide the normally liquid product stream and a hydrogen-rich vaporous phase. A portion of the latter is combined with the fresh charge stock as recycle hydrogen, while the remainder is vented from the process. I have found that, in view of the current improved catalytic composites and continuous catalyst regeneration, as illustrated in the prior art hereinbefore described, it is possible to effect catalytic reforming without a hydrogen-rich recycle gas stream. This permits a significant reduction in the initial capital cost of the unit by completely eliminating the recycle gas compressor. When there is no recycled hydrogen-rich recycle gas, the hydrogen/hydrocarbon mole ratio is obviously zero at the catalyst bed inlet of the first reactor. In catalytic reforming, most of the naphthenes are converted to aromatics in the first reactor; this produces a large amount of hydrogen. In fact, as much as 50.0% of the overall hydrogen production from catalytic reforming stems from the reactions effected in the first reactor. This hydrogen yield provides an increasing hydrogen-hydrocarbon ratio in the second reactor and subsequent reactors. This means that only reactor number one functions at zero hydrogen/hydrocarbon ratio, and only at the inlet thereto. Therefore, the formation of coke will be higher in this reactor than in any of the subsequent reactors. As hereinbefore stated, considering a four-reactor system, the reactant flow is serially 1-2-3-4; in a stacked system, the number one reaction zone is considered to be at the top. Also, catalyst distribution is generally unequal and such that the catalyst volume increases from one reactor to the next succeeding reactor; that is, the number one zone contains the least amount of catalyst particles, while the last, or fourth reaction zone contains more catalyst than any of the others.

My invention, as directed to a multiple-stage system wherein catalyst particles flow downwardly via gravity through each reaction zone, involves initially contacting the fresh feed charge stock with those catalyst particles which have attained the greatest degree of deactivation, and without recycle of hydrogen-rich gas. In accordance therewith, the flow of catalyst from one zone to another would be 2-3-4-1, with catalyst from number one being subjected to regeneration, and regenerated, or fresh catalyst particles being introduced into the number two reaction zone. Flow of the reactant stream is 1-2-3-4, so that the fresh feed charge stock initially contacts catalyst particles upon which about 5.0% by weight of coke has already been deposited. In the configuration wherein the reaction zones are stacked, the number one zone, containing the least amount of catalyst particles, is placed at the bottom of the stack. In addition to the advantages attendant the elimination of the recycle gas compressor, a principal benefit arises from an overall reduction in coke make. Through the elimination of the compressor, considering a unit having a daily charge stock capacity of about 20,000 barrels, there is an initial capital savings of about 1 million dollars. Additionally, the savings in "energy," about 4,000 BHP, converts to about $600,000 per year of operation.

Coke deposition occurs at a considerably reduced rate on a catalyst that has already been partially deactivated by coke, that it does on the freshly regenerated catalyst particles entering the system via the top reaction zone. In view of the fact that there is an overall reduction in the amount of coke make, the size and operating costs of the attendant regeneration facilities is also reduced. Another advantage is that less catalyst circulation is required because the catalyst leaving the last reactor can have a coke content as high as about 20.0% by weight, instead of the usual 2.0 to about 5.0%. High activity is not required in this reactor since the main reaction is the conversion of naphthenes into aromatic hydrocarbons.

BRIEF DESCRIPTION OF THE DRAWING

The further description of the present invention, and the method of operation, will be made in conjunction with the accompanying drawing. It is understood that the drawing is presented solely for the purpose of illustration, and the same is not intended to be construed as limiting upon the scope and spirit of my invention as defined by the appended claims. Therefore, miscellaneous appurtenances, not required for a complete understanding of the inventive concept, have been eliminated, or reduced in number. Such items are well within the purview of one possessing the requisite skill in the appropriate art. The illustrated embodiment is presented as a simplified schematic flow diagram showing a four reaction zone, stacked catalytic reforming system 1 having a charge heater 11 and reaction zone inter-heaters 14, 20 and 17.

DETAILED DESCRIPTION OF DRAWING

The stacked, gravity-flowing catalyst system 1 is shown as having four individual reaction zones 2, 3, 4 and 5 which are sized both as to length and cross-sectional catalyst area such that the distribution of the total catalyst volume is 15.0%, 25.0%, 50.0% and 10.0%, respectively. Fresh, or regenerated catalyst particles are introduced into the uppermost zone 2 by way of conduit 6 and inlet port 7, and flow via gravity therefrom into reaction zone 3, from zone 3 into zone 4, from zone 4 into zone 5, and are ultimately withdrawn from the system through a plurality of outlet ports 8 and conduits 9. Catalyst particles so removed may be transported to a continuous regeneration zone (not illustrated), or may be stored until a sufficient quantity is available for batchwise regeneration. The catalyst particles in reaction zone 5 contain about 10.0–20.0% by weight of coke; however, there is sufficient residual activity to effect substantial conversion of naphthenes to aromatics and hydrogen. Therefore, the naphtha boiling range charge stock, without recycle hydrogen, is introduced via line 10, after suitable heat-exchange with a higher temperature stream, into charge heater 11, wherein the temperature is increased to the desired level. The heated feed emanates through conduit 12 and is introduced thereby into reaction zone 5. Approximately 80.0 to about 90.0% of the naphthenes are dehydrogenated to aromatics, with the accompanying production of hydrogen.

Since the dehydrogenation reactions effected in reaction zone 5 are principally endothermic, the temperature of the effluent therefrom in line 13 will be increased through the use of reaction zone inter-heater 14. Heated effluent in line 15 is then introduced into uppermost reaction zone 2, into which regenerated, or fresh catalyst particles are introduced via conduit 6 and inlet port 7. Effluent from reaction zone 2 is introduced, via line 16, into reaction zone inter-heater 17 wherein the temperature is once again increased; heated effluent is passed through conduit 18 into reaction zone 3. Effluent from reaction zone 3 is passed via conduit 19 into inter-heater 20, and therefrom into reaction zone 4 via conduit 21. Product effluent is withdrawn from reaction zone 4 through line 22 and, following its use as a heat-exchange medium, introduced thereby into condenser 23 wherein the temperature is further decreased to a level in the range of about 60° to 140° F. The condensed material is transferred into separator 25 by way of line 24, wherein separation into a normally liquid phase, line 26, and a hydrogen-rich vaporous phase, line 27, is effected.

Through the implementation of the prevent invention, as above described, the catalytic reforming of a hydrocarbon charge stock is effected in a multiple-stage system, in which catalyst particles flow downwardly, via gravity, through each reaction zone in the system, and wherein particles from one reaction zone are introduced into the next succeeding reaction zone, without the recycling of a portion of the hydrogen-rich vaporous phase separated from the desired normally liquid product effluent. As will be recognized by those skilled in the art, there is afforded a significant capital savings as a result of eliminating the recycle gas compressor, in addition to a concomitant savings in operational utility requirements.

I claim as my invention:

1. A process for the catalytic reforming of a naphtha charge stock with a catalyst comprising a Group VIII noble metal on an alumina support to produce a gasoline fraction of higher octane number in a multiple-stage system in which (1) catalyst particles flow downwardly, via gravity, through each reaction zone in said system, (2) catalyst particles are transferred in series from reaction zone to reaction zone in said system, (3) deactivated catalyst particles are withdrawn from said system through the lower end of the last reaction zone, and, (4) fresh, or regenerated catalyst particles are introduced into the upper end of the first reaction zone, which comprises the sequential steps of:

a. reacting said charge stock, in the absence of added or recycled hydrogen, in said last reaction zone, from which deactivated catalyst particles are withdrawn from said system, at catalytic reforming conditions;

b. further reacting the effluent from said last reaction zone in said first reaction zone, through which fresh or regenerated catalyst particles are introduced into said system, at catalytic reforming conditions;

c. further reacting the effluent from said first reaction zone in at least one intermediate reaction zone, at catalytic reforming conditions; and, d. recovering a normally liquid, catalytically-reformed product from the effluent withdrawn from said intermediate zone.

2. The process of claim 1 further characterized in that said multiple-stage system comprises at least three reaction zones.

3. The process of claim 1 further characterized in that the reaction zones in said system are in side-by-side configuration, and the catalyst particles are transported from the lower end of one reaction zone to the upper end of the next succeeding reaction zone.

4. The process of claim 1 further characterized in that, the reaction zones in said system are vertically-stacked, along a common vertical axis, and the catalyst particles flow via gravity from one reaction zone to the next succeeding reaction zone.

5. The process of claim 1 further characterized in that said last reaction zone contains the least amount of catalyst particles.

6. The process of claim 1 further characterized in that said multiple-stage system contains four reaction zones.

7. A multiple-stage catalytic reforming of a naphtha charge stock with a catalyst comprising a Group VIII noble metal on an alumina carrier to produce a gasoline fraction of higher octane number than said naphtha which comprises the steps of:

a. introducing fresh, or regenerated catalyst particles into the upper end of a first reaction zone, through which said particles are movable via gravity-flow, and transferring catalyst particles from the lower end of said first zone into the upper end of a second reaction zone, through which said catalyst particles are movable via gravity-flow;

b. transferring catalyst particles from the lower end of said second zone and introducing them into the upper end of a third reaction zone, through which catalyst particles are movable via gravity-flow;

c. transferring catalyst particles from the lower end of said third zone and introducing them into the upper end of a fourth reaction zone, through which catalyst particles are movable via gravity-flow, and withdrawing deactivated catalyst particles from the lower end of said fourth zone;

d. reacting a hydrocarbon charge stock, in the absence of added or recycled hydrogen, in said fourth reaction zone at catalytic reforming conditions;

e. further reacting the resulting fourth zone effluent in said first reaction zone at catalytic reforming conditions;

f. further reacting the resulting first zone effluent in said second reaction zone at catalytic reforming conditions;

g. further reacting the resulting second zone effluent in said third reaction zone at catalytic reforming conditions; and, h. recovering a normally liquid, catalytically-reformed product from the resulting third reaction zone effluent.

8. The process of claim 7 further characterized in that said four reaction zones are disposed in side-by-side relationship, and said catalyst particles are transported from the lower end of one reaction zone to the upper end of the next succeeding reaction zone.

9. The process of claim 7 further characterized in that said four reaction zones are stacked, having a common vertical axis, and said catalyst particles are movable from one reaction zone to the next succeeding reaction zone via gravity-flow.

10. The process of claim 7 further characterized in that said first reaction zone contains about 10.0 to about 20.0% by volume of the total catalyst, said second reaction zone from about 20.0 to about 30.0%, said third reaction zone from about 40.0 to about 60.0% and said fourth reaction zone from about 5.0 to about 15.0%.

* * * * *